United States Patent
Hong

(10) Patent No.: US 12,314,195 B2
(45) Date of Patent: May 27, 2025

(54) INTERFACE DEVICE HAVING PLURALITY OF PORTS AND METHOD OF OPERATING THE SAME

(71) Applicant: SK hynix Inc., Gyeonggi-do (KR)

(72) Inventor: Seung Kyu Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 40 days.

(21) Appl. No.: 18/074,616

(22) Filed: Dec. 5, 2022

(65) Prior Publication Data
US 2024/0012770 A1  Jan. 11, 2024

(30) Foreign Application Priority Data
Jul. 8, 2022  (KR) .................. 10-2022-0084371

(51) Int. Cl.
*G06F 13/16*  (2006.01)
(52) U.S. Cl.
CPC ...... *G06F 13/1673* (2013.01); *G06F 13/1684* (2013.01)
(58) Field of Classification Search
None
See application file for complete search history.

(56) References Cited

U.S. PATENT DOCUMENTS

| | | | |
|---|---|---|---|
| 2007/0153576 A1* | 7/2007 | Oh | G11C 11/5628 365/185.11 |
| 2009/0216960 A1* | 8/2009 | Allison | G06F 13/1642 711/149 |

FOREIGN PATENT DOCUMENTS

| | | |
|---|---|---|
| KR | 10-2011-0011922 A | 2/2011 |
| KR | 10-2016-0030440 A | 3/2016 |

* cited by examiner

*Primary Examiner* — Farley Abad
*Assistant Examiner* — Dayton Lewis-Taylor
(74) *Attorney, Agent, or Firm* — IP & T GROUP LLP

(57) ABSTRACT

Provided herein may be an interface device having a plurality of ports and a method of operating the same. The interface device may include a first port, a second port, and a controller. The first port may include a first port buffer. The second port may include a second port buffer. The controller may be configured to exchange data with the first port and the second port. In a single port mode, at least one of the first port buffer and the second port buffer may be set as a buffer memory of the controller.

16 Claims, 20 Drawing Sheets

INTERFACE DEVICE HAVING PLURALITY OF PORTS AND METHOD OF OPERATING THE SAME

CROSS-REFERENCE TO RELATED APPLICATION

The present application claims priority under 35 U.S.C. § 119(a) to Korean patent application number 10-2022-0084371, filed on Jul. 8, 2022, the entire disclosure of which is incorporated herein by reference.

BACKGROUND

Field of Invention

Various embodiments of the present disclosure generally relate to an electronic device, and more particularly to an interface device having a plurality of ports and a method of operating the interface device.

Description of Related Art

Peripheral Component Interconnect (PCI) defines a bus protocol used to couple input/output devices to a host device. PCI Express (PCIe) has the concept of programming defined in a PCI standard and defines a physical communication layer as a high-speed serial interface.

A storage device is a device which stores data under the control of a host device such as a computer or a smartphone. The storage device may include a memory device in which data is stored and a memory controller which controls the memory device. Memory devices may be classified into a volatile memory device and a nonvolatile memory device.

The volatile memory device may be a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to an interface device that is capable of efficiently using buffers included in a plurality of ports and a method of operating the interface device.

An embodiment of the present disclosure may provide for an interface device. The interface device may include a first port, a second port, and a controller. The first port may include a first port buffer. The second port may include a second port buffer. The controller may be configured to exchange data with the first port and the second port. In a single port mode, at least one of the first port buffer and the second port buffer may be set as a buffer memory of the controller.

An embodiment of the present disclosure may provide for a method of operating an interface device. The method of operating the interface device may include checking a port mode of an interface device including a plurality of ports and a controller, and setting a port buffer included in an unused port of the plurality of ports as a buffer of the controller when the port mode is checked as a single port mode.

An embodiment of the present disclosure may provide for an interface device. The interface device may include first and second ports and a controller. The first and second ports are each configured to be activated to transfer data, and the second port has a port buffer. The controller is configured to activate the first port to transfer the data between an external device and the controller while keeping the second port deactivated and utilizing the port buffer as a buffer of the controller.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
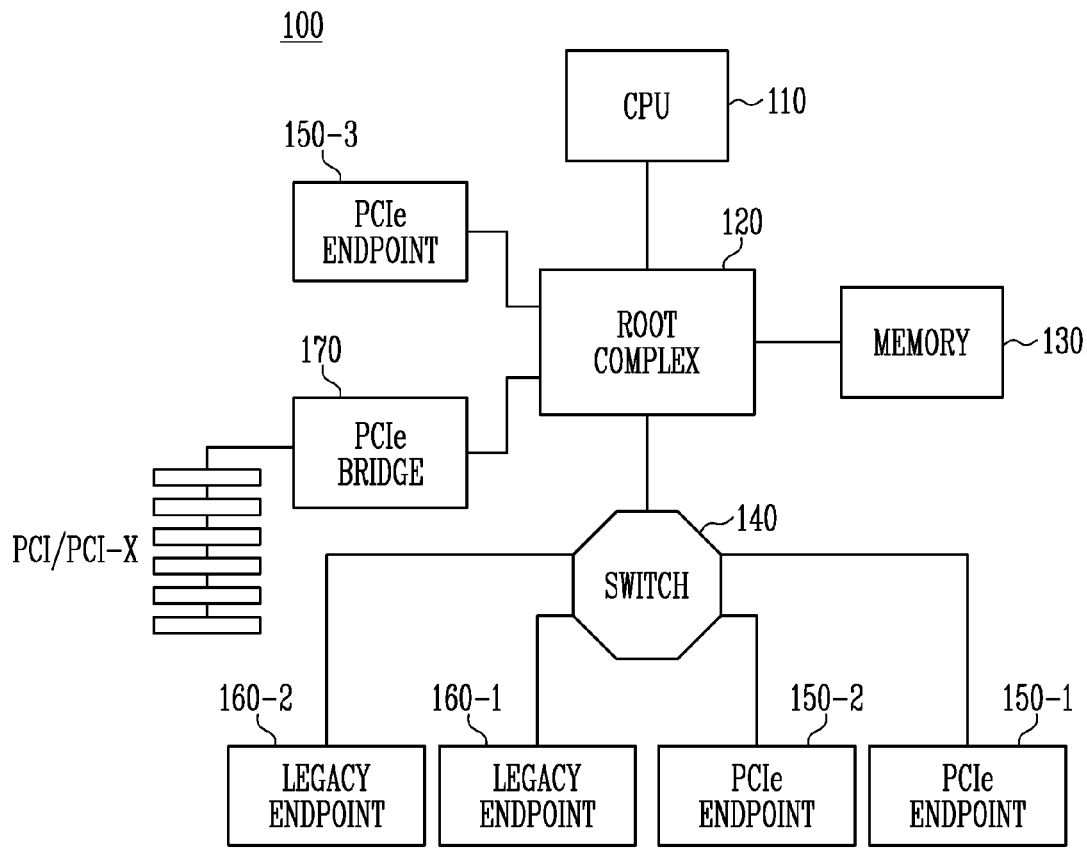
FIG. 1 is a diagram for describing an example of a computing system according to an embodiment of the present disclosure.

FIG. 1 is a diagram for describing an example of a computing system according to an embodiment of the present disclosure.

Referring to FIG. 1, a computing system 100 may include a central processing unit (CPU) 110, a root complex 120, a memory 130, a switch 140, PCIe endpoints 150-1 to 150-3, legacy endpoints 160-1 and 160-2, and a PCIe bridge 170.

The computing system 100 may be an electronic device that supports communication using a PCIe interface. The computing system 100 may include a PC, a laptop computer, or a mobile computing device, and may include an expansion card, an expansion board, an adapter card, an add-in card, or an accessory card. Also, the computing system 100 may include a printed circuit board (PCB) that may be inserted into an electric connector or an expansion slot on a motherboard of the computing system 100 so as to provide an additional function to the computing system 100 through an expansion bus. Further, the computing system 100 may include a storage device such as a solid state drive (SSD), and may include a graphic card, a network card, or a universal serial bus (USB) card.

The CPU 110 may be electrically connected to individual components of the computing system 100, and may control individual operations of the computing system 100. In detail, the CPU 110 may control the components of hardware or software connected to the CPU 110 by running an operating system or an application, and may perform various types of data processing and operations. Further, the CPU 110 may execute software or an application for controlling the operation of the computing system 100.

The root complex 120 may be a root hub, a controller hub, or a root controller in a Peripheral Component Interconnect Express (PCIe) interconnection architecture. For example, the root complex 120 may include a chipset, a memory controller hub (MCH), a north bridge, an interconnect controller hub (ICH), a south bridge, and a root controller/hub. Further, the root complex 120 may couple the CPU 110 and the memory 130 to an input/output (I/O) hierarchy. The root complex 120 may support peer-to-peer (P2P) routing. The root complex 120 may include at least one host bridge and at least one root port. The root complex 120 may support one or more Peripheral Component Interconnect Express (PCIe) ports.

The memory 130 may store data, commands or program codes required for the operation of the computing system 100. In an embodiment, the memory 130 may store program codes that are operable to execute one or more operating systems (OS) and virtual machines (VM) and program codes that execute a virtualization intermediary (VI) for managing the virtual machines. Furthermore, the memory 130 may be implemented as a volatile memory device such as a DRAM or an SRAM.

The switch 140 may route packets or messages in an upstream or downstream manner. In detail, the switch 140 may route packets or messages from the corresponding PCIe endpoint (e.g., 150-1) to an upper portion of the layer towards the root complex 120. Alternatively, the switch 140 may route packets or messages from the root complex 120 to a lower portion of the layer towards the corresponding PCIe endpoint (e.g., 150-2).

The switch 140 may be referred to as a logic assembly of a bridge device between a plurality of virtual PCI-to-PCI devices (i.e., virtual PCI-to-PCI bridge devices). Devices that are connectable to the switch 140 may include any internal or external device or component coupled to an electronic system, such as an I/O device, a network interface controller (NIC), an add-in card, an audio processor, a network processor, a hard drive, a storage device, a CD/DVD ROM, a monitor, a printer, a mouse, a keyboard, a router, a removable storage device, a FireWire device, a universal serial bus (USB) device, a scanner, or an additional input/output device. Although not illustrated in detail in the drawing, the device may include a PCIe to PCI/PCI-X bridge supporting a legacy or another version of PCIe device. In an embodiment, the root complex 120 may be coupled to the endpoints. The term "endpoint" refers to the type of function that may be a requester or completer of a PCIe transaction. Such endpoints may be classified into legacy endpoints and PCIe endpoints.

Each of the PCIe endpoints 150-1 to 150-3 and the legacy endpoints 160-1 and 160-2 may function as the requester or completer of a PCIe transaction. Transaction layer packets (TLP) transmitted/received by the PCIe endpoints 150-1 to 150-3 and the legacy endpoints 160-1 and 160-2 may provide a configuration space header. Further, each of the PCIe endpoints 150-1 to 150-3 and the legacy endpoints 160-1 and 160-2, as a completer, may provide a configuration request. In a specific condition, transaction layer packets (TLP) transmitted/received by the PCIe endpoints 150-1 to 150-3 and the legacy endpoints 160-1 and 160-2 must provide a configuration space header. Furthermore, each of the PCIe endpoints 150-1 to 150-3 and the legacy endpoints 160-1 and 160-2, as a completer, must provide a configuration request.

The PCIe endpoints 150-1 to 150-3 and the legacy endpoints 160-1 and 160-2 may be classified depending on the size of a memory transaction. For example, when a memory transaction exceeding a size of 4 GB is available, the endpoints may be the PCIe endpoints 150-1 to 150-3, whereas when a memory transaction exceeding a size of 4 GB is unavailable, the endpoints may be the legacy endpoints 160-1 and 160-2. The PCIe endpoints 150-1 to 150-3 should not generate an input/output request, but the legacy endpoints 160-1 and 160-2 may provide or generate an input/output request. Also, the PCIe endpoint 150-3 may transmit/receive a TLP to/from the root complex 120. Furthermore, PCI/PCI-X may transmit/receive a TLP to/from the root complex 120 through the PCIe bridge 170. The PCIe endpoints 150-1 and 150-2 or the legacy endpoints 160-1 and 160-2 may transmit/receive a TLP to/from the switch 140.

Each of the PCIe endpoints 150-1 to 150-3 may be a function having a type 00h configuration space header. Each of the PCIe endpoints 150-1 to 150-3, as a completer, may support a configuration request. A PCIe-compatible software driver and an application may be created such that, when the PCIe endpoints 150-1 to 150-3 are accessed, lock semantics are not used. Each of the PCIe endpoints 150-1 to 150-3, functioning as a requester of a memory transaction, may generate addresses above 4 GB. When an interrupt resource is requested, the PCIe endpoints 150-1 to 150-3 may be required in order to support either or both of message signaled interrupt (MSI) and MSI-X. When MSI is implemented, the PCIe endpoints 150-1 to 150-3 may support 64-bit message address version of an MSI function structure. A minimum memory address range requested by a base address register may be 128 bytes. The PCIe endpoints 150-1 to 150-3 may be included in one of hierarchy domains originated from the root complex 120.

Each of the legacy endpoints 160-1 and 160-2 may be a function having a type 00h configuration space header. Each of the legacy endpoints 160-1 and 160-2, as a completer, may support a configuration request. Each of the legacy endpoints 160-1 and 160-2, as a completer, may support an I/O request. The legacy endpoints 160-1 and 160-2 may accept I/O requests for either or both of 80h and 84h locations regardless of the I/O decoding configuration of the corresponding endpoint. Each of the legacy endpoints 160-1 and 160-2 may generate an I/O request. Each of the legacy endpoints 160-1 and 160-2 may implement extended configuration space capabilities. Each of the legacy endpoints 160-1 and 160-2, functioning as a requester of a memory transaction, may not generate addresses above 4 GB. When an interrupt resource is requested, the legacy endpoints 160-1 and 160-2 are required in order to support either or both of MSI and MSI-X. When MSI is implemented, the legacy endpoints 160-1 and 160-2 may support 32-bit or 64-bit message address version of an MSI function structure. The legacy endpoints 160-1 and 160-2 may support 32-bit addressing for a base address register which requests memory resources. The legacy endpoints 160-1 and 160-2 may be included in one of hierarchy domains originated from the root complex 120.

Figure 2:
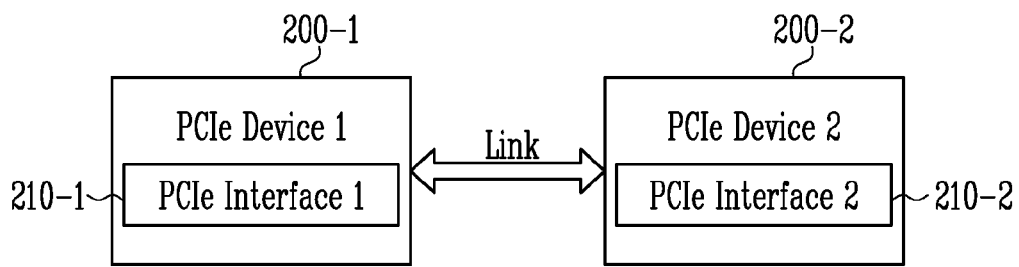
FIG. 2 is a diagram for describing a PCIe device according to an embodiment of the present disclosure.

FIG. 2 is a diagram for describing a PCIe device according to an embodiment of the present disclosure.

Referring to FIG. 2, the PCIe device may include a PCIe interface, and may be an electronic device which supports transmission/reception using the PCI interface. For example, a first PCIe device 200-1 or a second PCIe device 200-2 may be one of the root complex 120, the switch 140, the PCIe endpoints 150-1 to 150-3, the legacy endpoints 160-1 and 160-2, and the PCIe bridge 170 of FIG. 1.

Also, the first PCIe device 200-1 or the second PCIe device 200-2 may perform communication using a first PCIe interface 210-1 or a second PCIe interface 210-2. In detail, the first PCIe device 200-1 may convert data to be transmitted from the second PCIe device 200-2 into a protocol suitable for communication using the first PCIe interface 210-1. Also, the first PCIe device 200-1 and the second PCIe device 200-2 may form a link, and may communicate with each other through the formed link. For example, the first PCIe device 200-1 or the second PCIe device 200-2 may transmit/receive packets through the link.

Figure 3:
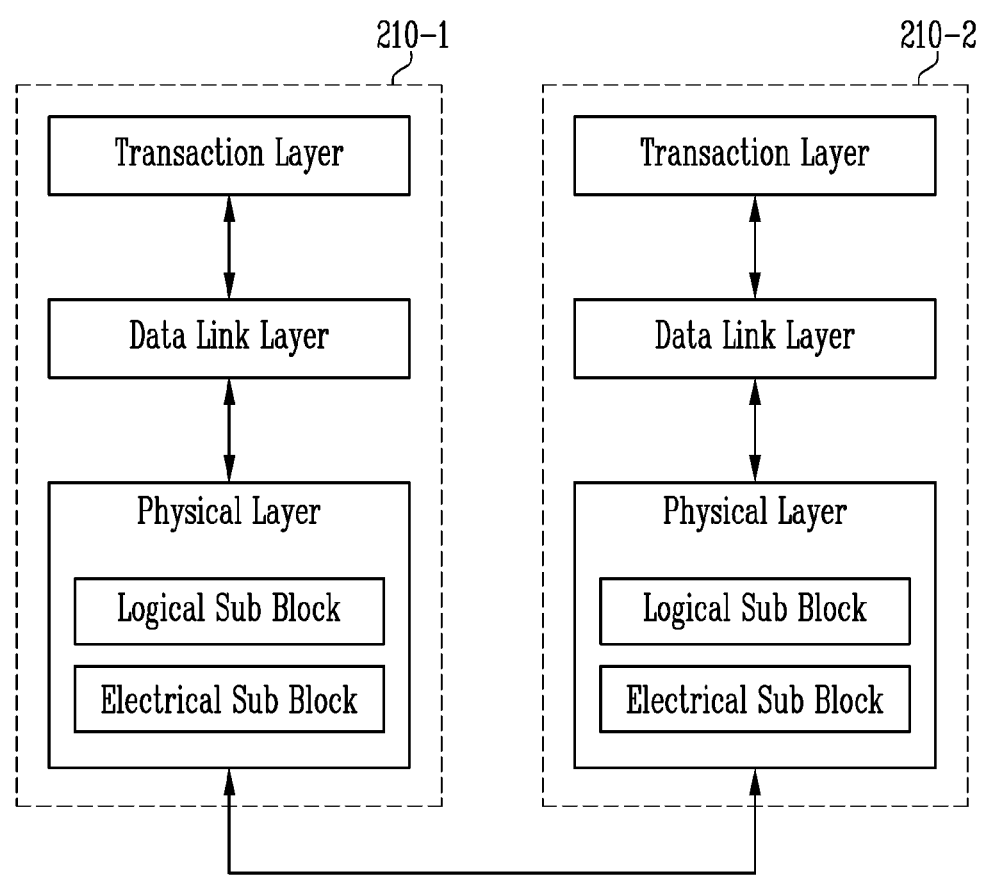
FIG. 3 is a diagram for describing a PCIe interface according to an embodiment of the present disclosure.

FIG. 3 is a diagram for describing a PCIe interface according to an embodiment of the present disclosure.

Referring to FIG. 3, a first PCIe interface 210-1 and a second PCIe interface 210-2 are illustrated. Because the first PCIe interface 210-1 and the second PCIe interface 210-2 may be formed in the same structure, a description will be made below based on the first PCIe interface 210-1.

PCIe layers included in the first PCIe interface 210-1 may include three discrete logical layers. For example, the first PCIe interface 210-1 may include a transaction layer, a data link layer, and a physical layer. Each of the layers may include two sections. One of the sections may process outbound information (or information to be transmitted), and the other may process inbound information (or received information). Also, the first PCIe interface 210-1 may use packets to communicate information between other PCIe interfaces.

In the structure of the PCIe interface, an upper layer may be a transaction layer. The transaction layer may assemble or disassemble transaction layer packets (TLPs). Further, the transaction layer may implement a split transaction, that is, a transaction which enables additional traffic to be transferred through a link while a target system is collecting data required for a response. For example, the transaction layer may implement a transaction in which a request and a response are temporally separated. In an embodiment, four transaction address spaces may include a configuration address space, a memory address space, an input/output address space, and a message address space. A memory space transaction may include one or more of a read request and a write request to deliver data to/from a memory-mapped place. In an embodiment, the memory space transaction may use two different address formats, for example, a short address format such as a 32-bit address or a long address format such as a 64-bit address. A configuration space transaction may be used to access the configuration space of the PCIe device. A transaction to the configuration space may include a read request and a write request. A message space transaction (or message) may be defined to support in-band communication between PCIe devices.

The transaction layer may store link configuration information or the like. Further, the transaction layer may generate a TLP, or may convert a received TLP into a payload or status information.

In the structure of the PCIe interface, a middle layer may be a data link layer, and the data link layer may function as the intermediate stage between the transaction layer and the physical layer. The main function of the data link layer may be link management and data integrity, including error detection and error correction. Specifically, a transmitting side of the data link layer may accept TLPs assembled by the transaction layer, assign a data protection code, or calculate TLP sequence numbers. Furthermore, the transmitting side of the data link layer may transmit the data protection code and the TLP sequence numbers to the physical layer to transmit the corresponding data through a link. A receiving side of the data link layer may check the data integrity of TLPs received from the physical layer and transmit the TLPs to the transaction layer to perform additional processing.

The physical layer may include all circuitry for interface operations. Here, all circuitry may include a driver, an input buffer, a serial-to-parallel conversion circuit, a parallel-to-serial conversion circuit, a phase-locked loop (PLL), and an impedance matching circuit.

Further, the physical layer may include a logical sub-block and an electrical sub-block which physically transmit packets to an external PCIe device. Here, the logical sub-block may perform a role that is necessary for a 'digital' function of the physical layer. With regard to this, the logical sub-block may include a transmission section for preparing outgoing information to be transmitted by a physical sub-block and a reception section for identifying and preparing the received information before delivering the received information to the data link layer. The physical layer may include a transmitter and a receiver. The transmitter may be supplied with symbols, which are serialized and transmitted to the external device by the transmitter, through the logical sub-block. Further, the receiver may be supplied with serialized symbols from the external device, and may convert the received signal into a bitstream. The bitstream may be deserialized and supplied to the logical sub-block. That is, the physical layer may convert the TLPs received from the data link layer into a serialized format, and may convert the packets received from the external device into a deserialized format. Furthermore, the physical layer may include logical functions related to interface initialization and maintenance.

Although the structures of the first PCIe interface 210-1 and the second PCIe interface 210-2 are illustrated by way of example in FIG. 3, the PCIe interface may include an arbitrary form, such as a quick-path interconnect structure, a next-generation high-performance computing interconnect structure, or any other hierarchical structures.

Figure 4:
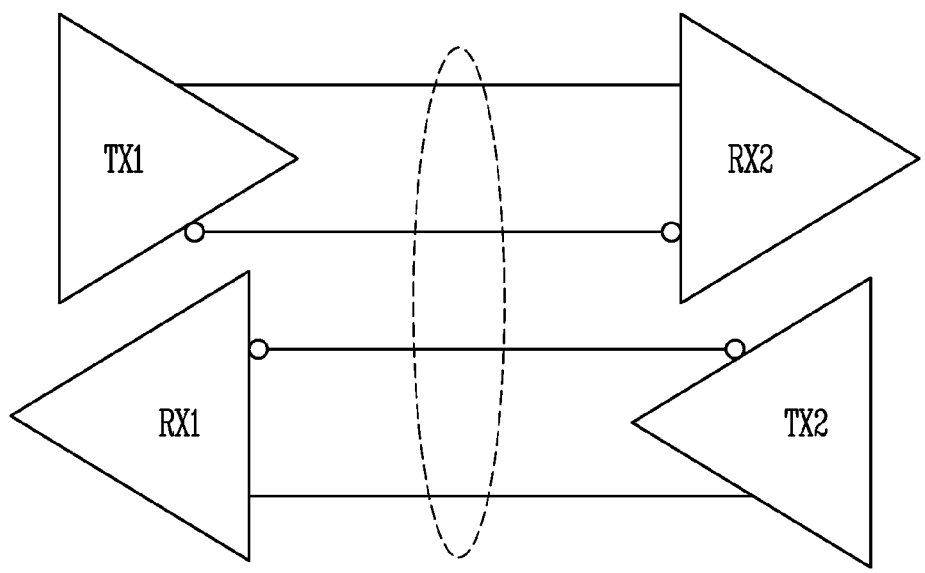
FIG. 4 is a diagram for describing a transmitter, a receiver, and a lane according to an embodiment of the present disclosure.

FIG. 4 is a diagram for describing a transmitter, a receiver, and a lane according to an embodiment of the present disclosure.

Referring to FIG. 4, a first transmitter TX1, a second transmitter TX2, a first receiver RX1, and a second receiver RX2 are illustrated. The lane may include path pairs including differentially driven signal pairs, for example, a transmission path pair configured for transmission and a reception path pair configured for reception. Each PCIe device may include a transmission logic, which transmits data to an additional PCIe device, and a reception logic, which receives data from an additional PCIe device. For example, the PCIe device may include two transmission paths coupled to the first transmitter TX1 and two reception paths coupled to the first receiver RX1.

Here, the term "transmission path" may refer to an arbitrary path through which data is to be transmitted, such as a transmission line, a copper line, an optical line, a wireless communication channel, an infrared communication link, or an additional communication path. Further, the term "reception path" may refer to a path which is implemented in the same manner as the transmission path, but is used for reception.

A connection between two PCIe devices, for example, the first PCIe device 200-1 and the second PCIe device 200-2 of FIG. 2, may be designated as a link. Such a link may support one or more lanes. For example, the link may include a plurality of lanes. Also, each lane may indicate one set of differential signal pairs (one pair is for transmission and the other pair is for reception). The differential signals may refer to two signals which have the same frequency and amplitude, but have opposite phases. For example, when a first signal indicates a rising edge at which the voltage level toggles from 0 to V+, the second signal may proceed to a falling edge at which the voltage level toggles from 0 to V−. The PCIe device may use signal integrity, for example, electrical characteristics such as cross-coupling, voltage overshoot/undershoot, and ringing, based on differential signals, and may adjust a transmission frequency to a higher frequency. In addition, the PCIe device may include a plurality of lanes to adjust the bandwidth. For example, the two PCIe devices may form a link including lanes such as 1, 2, 4, 8, 12, 16, 32, and 64.

Figure 5:
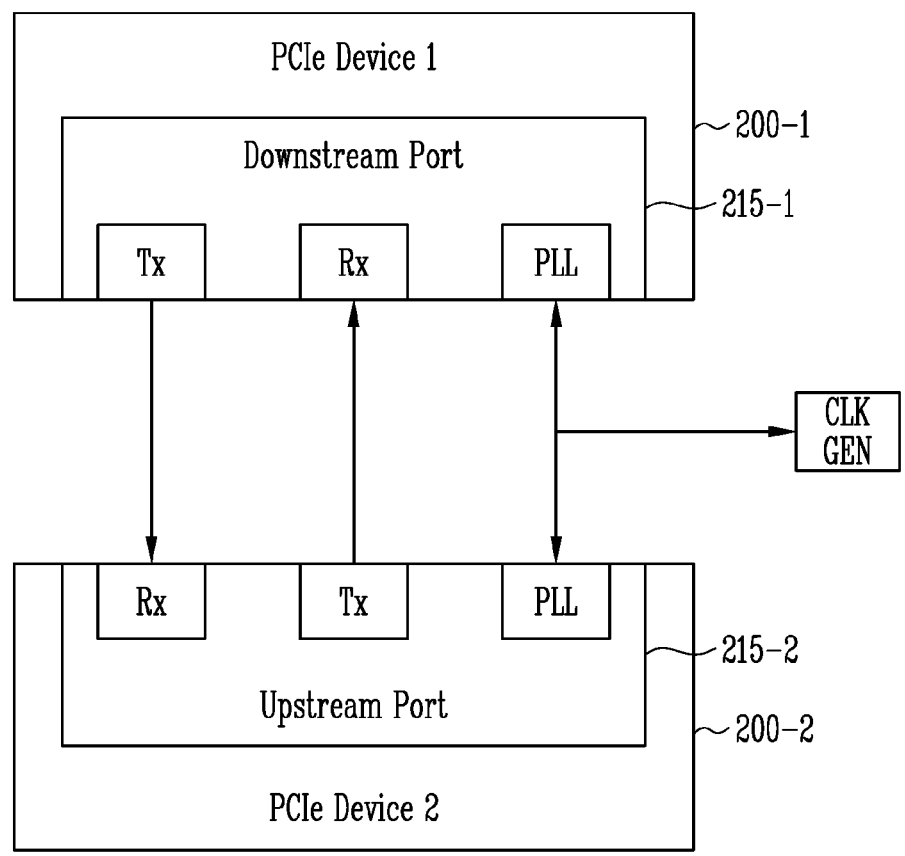
FIG. 5 is a diagram illustrating ports according to an embodiment of the present disclosure.

FIG. 5 is a diagram for describing ports according to an embodiment of the present disclosure.

Referring to FIG. 5, a downstream port 215-1 and an upstream port 215-2 included in a first PCIe device 200-1 and a second PCIe device 200-2, respectively, are illustrated.

In an embodiment, the first PCIe device 200-1 may be a layer higher than the second PCIe device 200-2, and data movement and transmission to the higher layer may be designated as 'upstream transfer'. In contrast, data movement and transmission to a lower layer may be designated as 'downstream transfer'. For example, referring to FIG. 1, the switch 140 may support downstream and upstream routing.

In detail, upstream routing may be routing of a packet or a message from the PCIe endpoint (e.g., 150-1) to an upper portion of a layer towards the root complex 120, and downstream routing may indicate routing of a packet or a message from the root complex 120 to a lower portion of a layer towards the PCIe endpoint (e.g., 150-2).

In an embodiment, the first PCIe device 200-1 including the downstream port 215-1 may be referred to as an "upstream component". Here, the upstream component may indicate the root complex 120 or the switch 140 of FIG. 1. Further, the second PCIe device 200-2 including the upstream port 215-2 may be referred to as a "downstream component". Here, the downstream component may indicate one of the switch 140, the PCIe endpoints 150-1 and 150-2, the legacy endpoints 160-1 and 160-2, and the PCIe bridge 170 of FIG. 1.

Each of the downstream port 215-1 and the upstream port 215-2 may include a transmitter Tx, a receiver RX, and a phase locked loop (PLL) circuit. The PLL circuit may generate a clock signal to be supplied to the transmitter Tx or the receiver Rx using a clock signal provided by a clock signal generator CLK GEN. The PLL circuit may generate a clock signal having a changed frequency by multiplying the signal received from the clock signal generator CLK GEN. For example, the PLL circuit may multiply a reference clock signal REFCLK having a frequency of 100 MHz to output a clock signal having a frequency of 2.5 GHz. The transmitter Tx may convert a parallel data signal into a serial data signal using the output signal of the PLL circuit, and may transmit the serial data signal to an external device, for example, an external PCIe device. The receiver Rx may receive a serial data signal transmitted from the external device, and may generate a clock signal for reconstructing the received serial data signal and a clock signal for converting the reconstructed serial data signal into a parallel data signal using the output signal of the PLL circuit. The clock signal generator CLK GEN may generate the reference clock signal REFCLK to be used for the operation of the PCIe interface. Here, the operation of the PCIe interface may be in communication with the external PCIe device.

Figure 6:
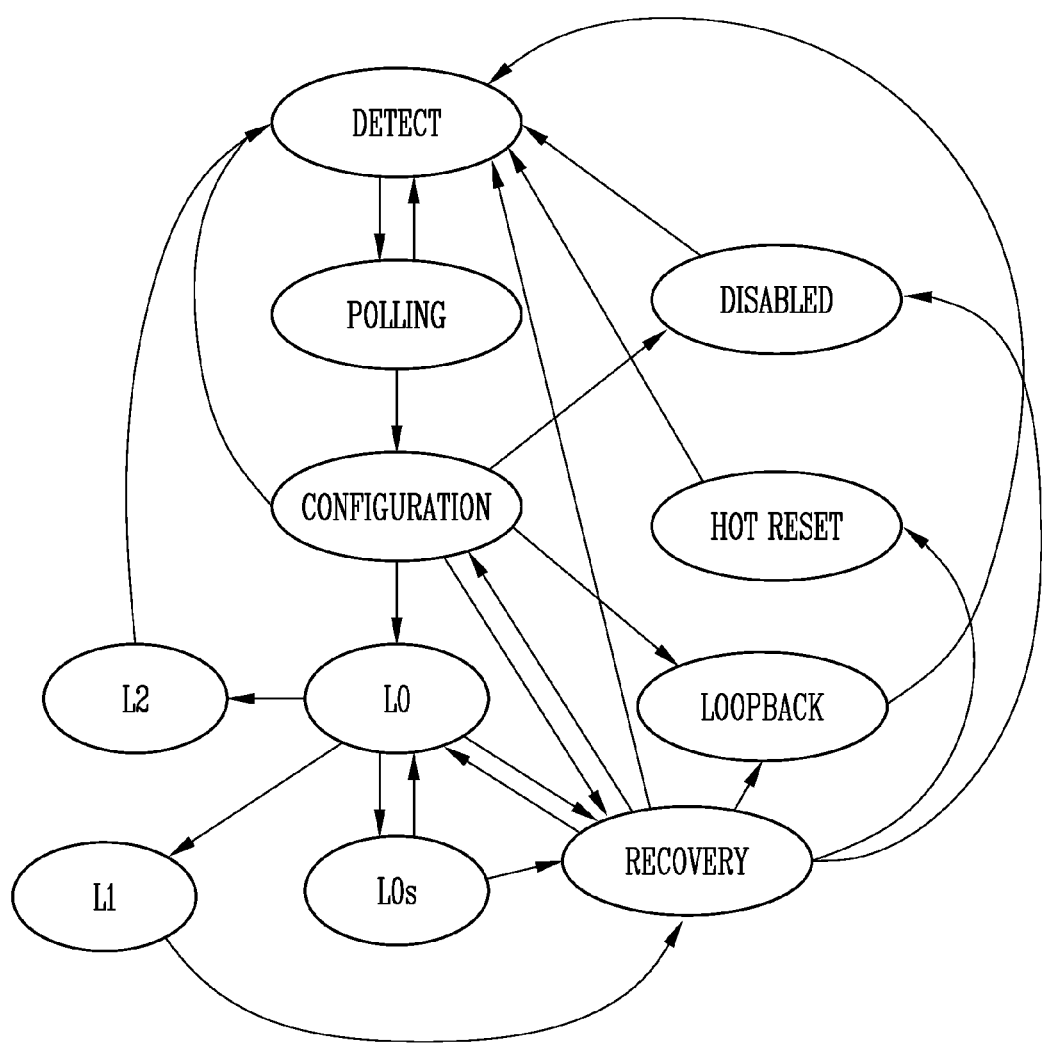
FIG. 6 is a diagram for describing the link status of a PCIe device according to an embodiment of the present disclosure.

FIG. 6 is a diagram for describing the link status of a PCIe device according to an embodiment of the present disclosure.

Referring to FIG. 6, the link status of the PCIe device, such as a detect state, a polling state, a configuration state, a hot reset state, a disabled state, and an L0 state, is depicted.

The detect state may be an initial state after a power-on operation or a reset operation, and may be a state entered from the following states. For example, the detect state may be a state entered from the configuration state, the hot reset state, the disabled state, an L2 state, a loopback state, and a recovery state. The detect state may be used to reset all logics, ports, and registers, and may be a step at which the link coupled to the PCIe interface is detected. That is, the detect state may indicate the step at which a physically connected lane is discovered.

The polling state may indicate a state in which a lane enabling data communication, among detected lanes, is identified. The polling state may indicate a step at which clocks at both ends of the PCIe interface are synchronized with each other, whether the polarity of the lane is D+ or D− is checked, and the data transfer rate usable by the lane is checked. That is, the polling state may indicate a state in which polarity inversion is checked. Further, the link in the polling state may enter the detect state or the configuration state.

The configuration state may be a state in which the coupling state of the lane is checked. In detail, the configuration state may be a state in which a lane width enabling data communication is fixed. Further, the configuration state may indicate a step at which lane reversal is checked. The configuration state may be entered from the polling state. Alternatively, when lane reduction occurs and a lane width increases (lane width up) after entering the L0 state, the link status may enter the configuration state.

The recovery state may be a state used to reconfigure a link bandwidth. The recovery state may be used to change the link bandwidth of an established link, and may reset bit lock, symbol lock, and lane-to-lane deskew. The recovery state may be entered when an error occurs in the L0 state, and may change to the L0 state after the error is recovered in the recovery state. Further, according to an embodiment of the present disclosure, a link equalization operation in the recovery state may be performed.

The L0 state may be a normal operational state in which data and packets may be transmitted and received through the link. In detail, the L0 state may be the operational state of a physical bus interface in which data and control packets may be transmitted and received. The L0 state may be a fully active state.

An L0s state may be a state that enables the physical bus interface to promptly enter a power conservation state and to be recovered therefrom without undergoing the recovery state. The L0s state may be a power saving state. The L0s state may be an idle or standby state for some functions in the interface.

An L1 state may be a power saving state. The L1 state may be a state in which power savings are added to that in the L0s state. The L1 state may be a low power standby state.

The L2 state may be an active power saving state. Most of transmitters and receivers may be shut off. Main power and clocks may not be guaranteed, but auxiliary power may be supplied. The L2 state may be a lower power sleep state in which power is not supplied to most functions. The loopback state may be a state required for separate use in testing and malfunctioning. The loopback state is operated only on a lane basis, wherein a loopback reception lane must be selected and configured.

The disabled state may be a state that disables the established link until an instruction is issued. The hot reset state may be triggered only by a downstream port. The downstream port may use training sequences (e.g., TS1 or TS2) to propagate a hot reset. Here, the training sequences (TS) may be an aligned set that is used for initializing bit alignment, performing symbol alignment, and exchanging physical layer parameters. In the present specification, "training sequences" may also be referred to as "training sequence ordered sets".

Figure 7:
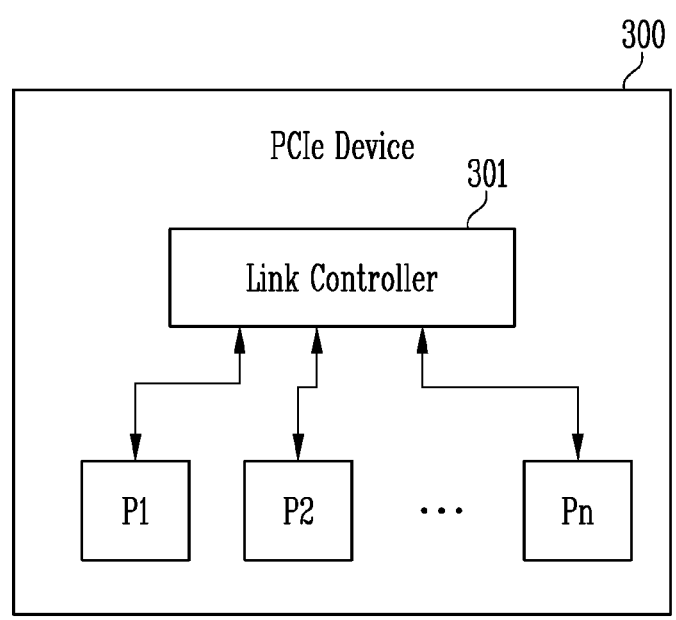
FIG. 7 is a diagram illustrating a PCIe device according to an embodiment of the present disclosure.

FIG. 7 is a diagram illustrating a PCIe device according to an embodiment of the present disclosure.

Referring to FIG. 7, a PCIe device 300 may include a plurality of ports P1 to Pn and a link controller 301.

The plurality of ports P1 to Pn may form a plurality of lanes. For example, as illustrated in FIG. 4, one port may form one lane, together with a port included in an additional PCIe device. In an embodiment, each of the plurality of ports P1 to Pn may be a downstream port or an upstream port. For example, when the plurality of ports P1 to Pn are downstream ports, the PCIe device 300 may be an upstream component. Further, when the plurality of ports P1 to Pn are upstream ports, the PCIe device 300 may be a downstream component. Each of the plurality of ports P1 to Pn may include a receiver and a transmitter.

The link controller 301 may establish a link. Here, the link may include a plurality of ports P1 to Pn. Here, the link may be formed by the plurality of ports P1 to Pn. For example, the link controller 301 may perform a link establishment operation of establishing the link. Here, the link establishment operation may denote a process of initializing and configuring the link so that the link is normally operated. The link establishment operation may indicate a link initialization and training operation based on PCIe specifications.

In an embodiment, the link controller 301 may include a Link Training and Status State Machine (LTSSM). The LTSSM may be a component for performing a link establishment operation.

The link controller 301 may perform link width and lane number negotiation. Here, the link width may indicate the number of lanes forming the link. For example, the link controller 301 may determine the link width during the process of establishing the link. The lane number may indicate a number assigned to each lane included in the link. For example, the link controller 301 may negotiate the number to be assigned to each lane during the process of establishing the link, and may determine the lane number of each lane depending on the result of negotiation. Here, the determined lane number may be transmitted to an additional PCIe device, and the additional PCIe device may accept the corresponding lane number.

In an embodiment, the link controller 301 may detect a failed lane, among the plurality of lanes, during the process of establishing the link. Here, the failed lane may be a lane having a state in which a link cannot be formed together with the remaining lanes. The remaining lanes may be lanes other than the failed lane, and may include all lanes except the failed lane, among the plurality of lanes. For example, when a problem occurs in a transmission path or reception path included in a lane, the corresponding lane may be a failed lane. In this case, the failed lane may not be normally operated upon transmitting data. For example, when the status of the link indicates a detect state, the link controller 301 may detect a failed lane through a link establishment operation corresponding to the detect state. The link establishment operation corresponding to the detect state may be an operation performed to establish a link in the detect state, and may include an operation of mutually detecting the link at both ends of the link. For example, both ends may be ports included in different PCIe devices connected to each other through the link. Thereafter, the link controller 301 may perform a link establishment operation corresponding to the detect state on the lanes other than the failed lane, among the plurality of lanes. Furthermore, when the status of the link indicates a polling state, the link controller 301 may detect a failed lane through a link establishment operation corresponding to the polling state. Here, the link establishment operation corresponding to the polling state may be an operation performed to establish a link in the polling state, and may include an operation of transmitting/receiving training sequence ordered sets. For example, the link establishment operation corresponding to the polling state may include an operation of transmitting/receiving training sequence ordered sets between ports coupled through the link. Thereafter, the link controller 301 may perform a link establishment operation corresponding to the polling state on the remaining lanes.

In an embodiment, the link controller 301 may establish a link so that the link has a link width including the remaining lanes. For example, when the status of the link indicates a configuration state, the link controller 301 may perform a link establishment operation corresponding to the configuration state on the remaining lanes. Here, the link establishment operation corresponding to the configuration state may be an operation performed to establish a link in the configuration state. For example, the link establishment operation corresponding to the configuration state may include an operation of setting a link width, an operation of determining a lane number, a lane-to-lane deskew operation, etc.

For example, the link controller 301 may determine the link number of each link in the configuration state, and may determine respective lane numbers of the remaining lanes. Here, the link controller 301 may determine the lane numbers of the remaining lanes through a lane number negotiation operation. In an embodiment, the link controller 301 may determine respective lane numbers of the remaining lanes so that the lane numbers of the remaining lanes sequentially increase or decrease.

In an embodiment, the link controller 301 may provide the link number determined through the plurality of ports P1 to Pn and respective determined lane numbers of the remaining lanes to other ports forming the plurality of lanes together with the plurality of ports P1 to Pn. Here, the other ports may be those included in an additional PCIe device other than the PCIe device 300. For example, the link controller 301 may provide the determined link number and the determined lane numbers of the remaining lanes to the other ports using the training sequence ordered sets. In this case, the additional PCIe device may accept the link number and respective lane numbers of the remaining lanes.

Figure 8A:
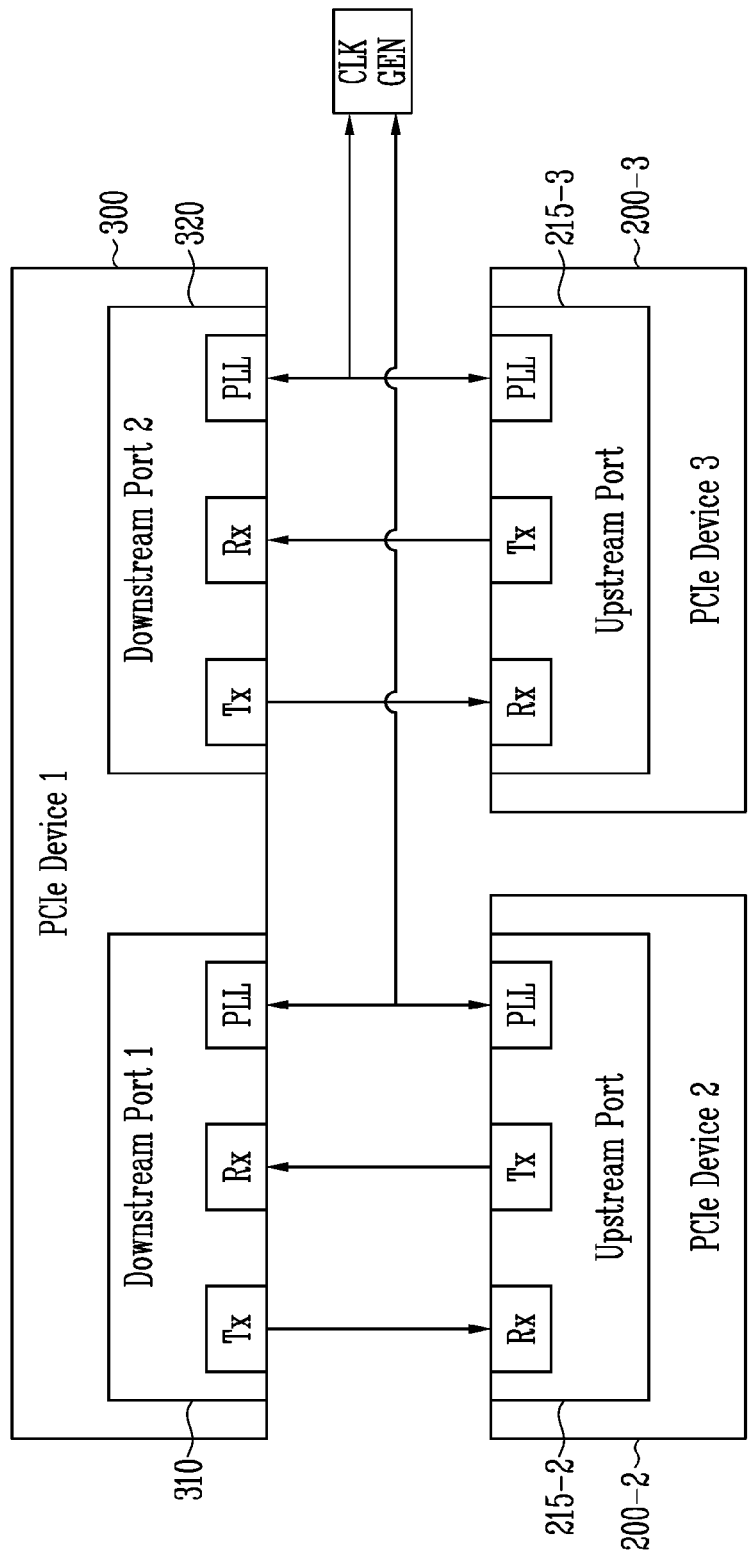
FIGS. 8A, 8B, and 8C are block diagrams illustrating a connection relationship between PCIe devices, each having a plurality of ports according to embodiments of the present disclosure.
Figure 8B:
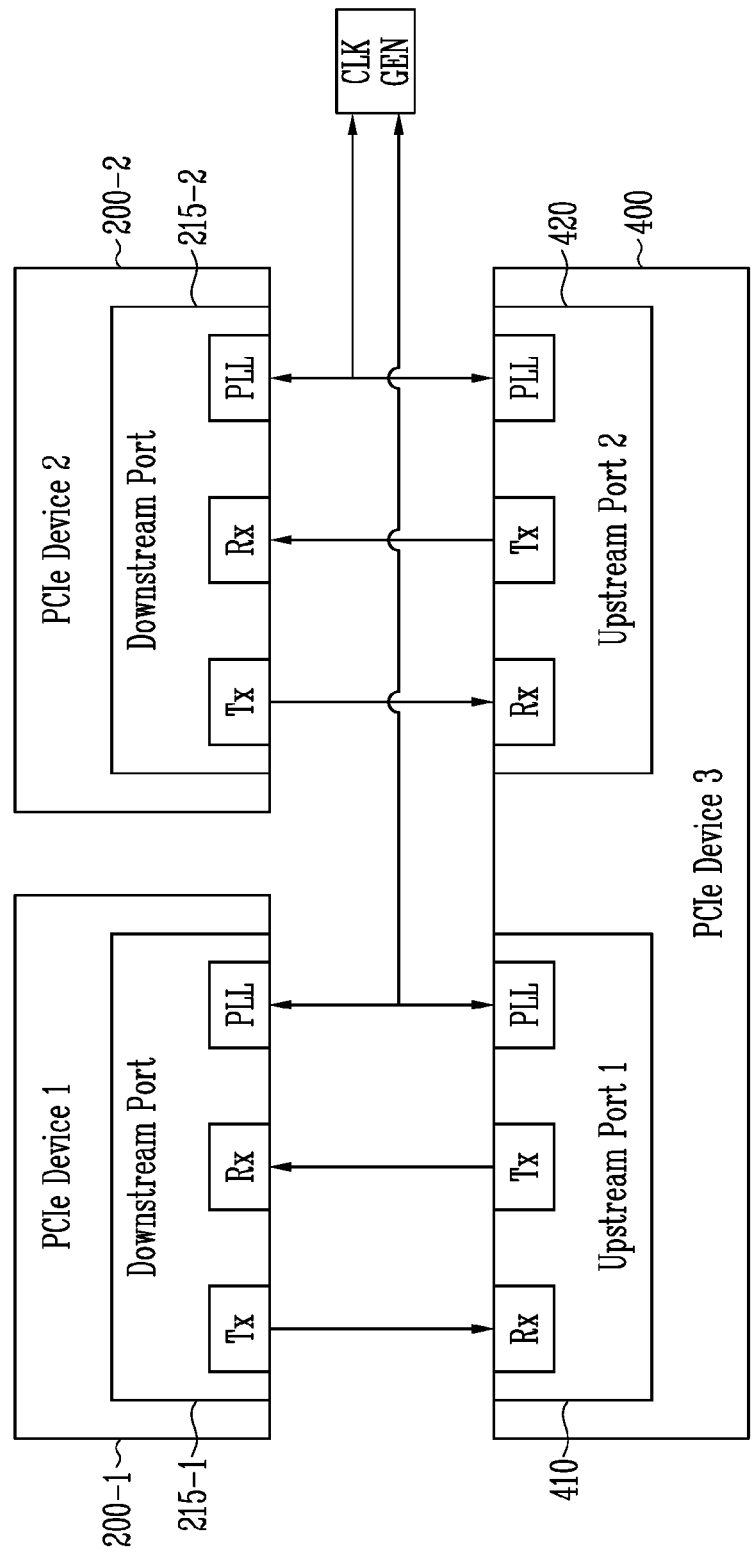
Figure 8C:
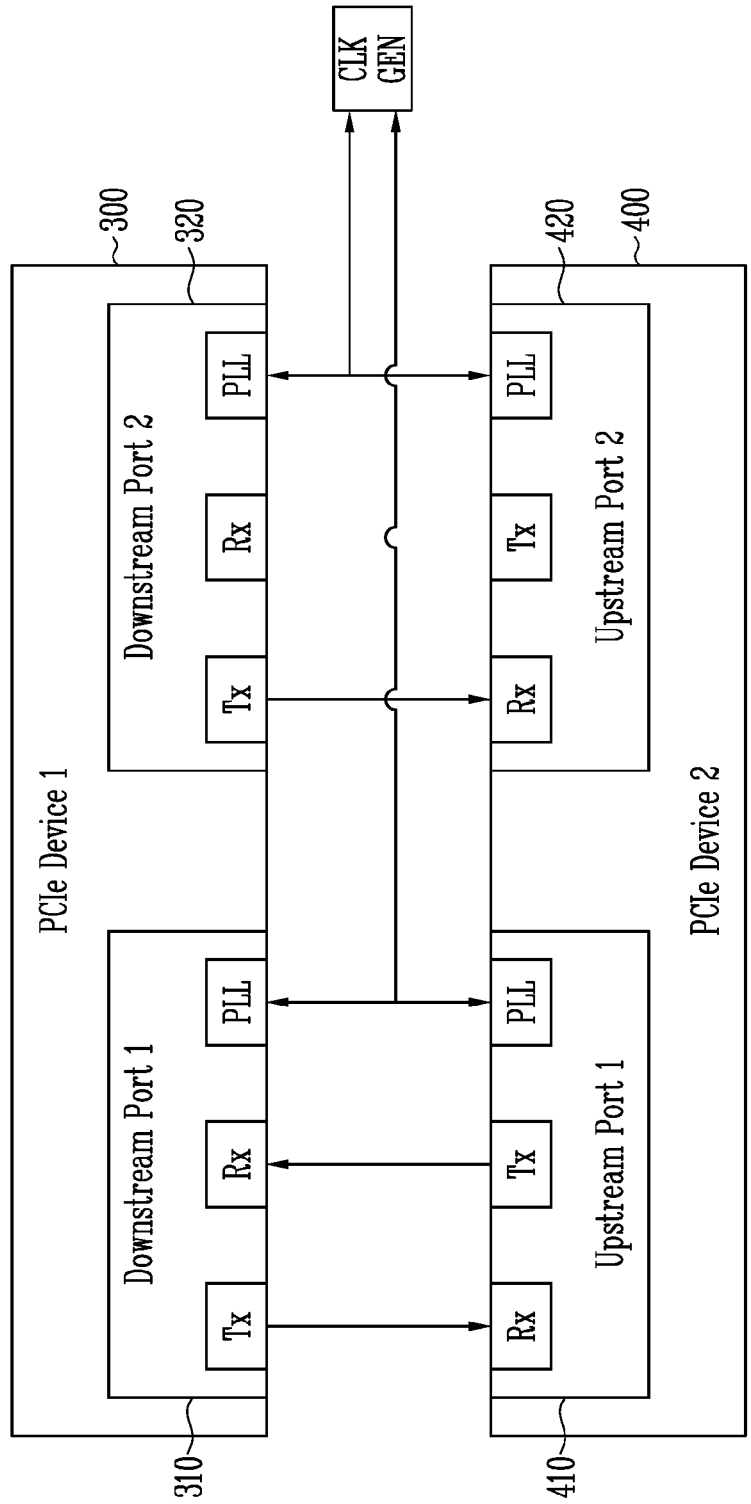

FIGS. 8A, 8B, and 8C are block diagrams illustrating a connection relationship between PCIe devices, each having a plurality of ports according to embodiments of the present disclosure.

Referring to FIG. 8A, a first PCIe device 300 including two downstream ports 310 and 320, a second PCIe device 200-2 including an upstream port 215-2, and a third PCIe device 200-3 including an upstream port 215-3 are illustrated. As illustrated in FIG. 8A, the first PCIe device 300 including the two downstream ports 310 and 320 may be connected to two different PCIe devices.

Referring to FIG. 8B, a first PCIe device 200-1 including a downstream port 215-1, a second PCIe device 200-2 including a downstream port 215-2, and a third PCIe device 400 including two upstream ports 410 and 420 are illustrated. As illustrated in FIG. 8B, the third PCIe device 400 including the two upstream ports 410 and 420 may be connected to two different PCIe devices.

Referring to FIG. 8C, a first PCIe device 300 including two downstream ports 310 and 320 and a second PCIe device 400 including two upstream ports 410 and 420 are illustrated. As illustrated in FIG. 8C, the first PCIe device 300 and the second PCIe device 400 may be connected to each other through the two downstream ports 310 and 320 and the two upstream ports 410 and 420.

Figure 9:
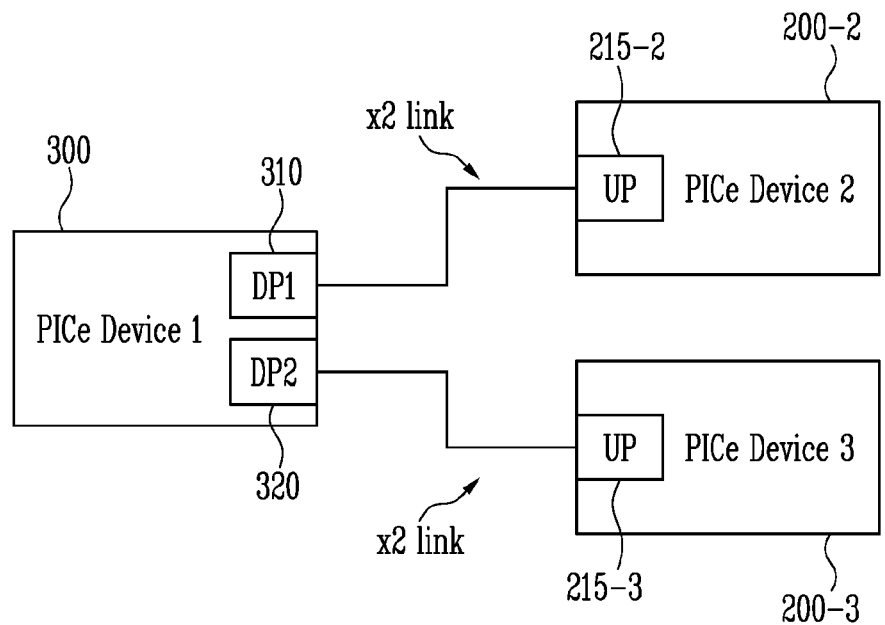
FIG. 9 is a block diagram illustrating PCIe devices connected through a single port structure according to an embodiment of the present disclosure.

FIG. 9 is a block diagram illustrating PCIe devices connected through a single port structure according to an embodiment of the present disclosure.

Referring to FIG. 9, a first PCIe device 300 including two downstream ports 310 and 320, a second PCIe device 200-2 including an upstream port 215-2, and a third PCIe device 200-3 including an upstream port 215-3 are illustrated. That is, the connection relationship between the PCIe devices illustrated in FIG. 9 may be substantially identical to the connection relationship between the PCIe devices illustrated in FIG. 8A.

In an embodiment, the second PCIe device 200-2 and the third PCIe device 200-3 may be connected to the first PCIe device 300 through respective x2 links. That is, the first downstream port 310 of the first PCIe device 300 and the upstream port 215-2 of the second PCIe device 200-2 may be configured as a x2 link. Further, the second downstream port 320 of the first PCIe device 300 and the upstream port 215-3 of the third PCIe device 200-3 may be configured as a x2 link.

Each of the second PCIe device 200-2 and the third PCIe device 200-3 may be connected to the first PCIe device 300 through one upstream port. That is, each of the second PCIe device 200-2 and the third PCIe device 200-3 may be connected to the first PCIe device 300 through a single port structure. In this case, the width of the link between the second PCIe device 200-2 and the first PCIe device 300 may be substantially the bandwidth of one port. Further, the width of the link between the third PCIe device 200-3 and the first PCIe device 300 may also be the bandwidth of one port.

Figure 10:
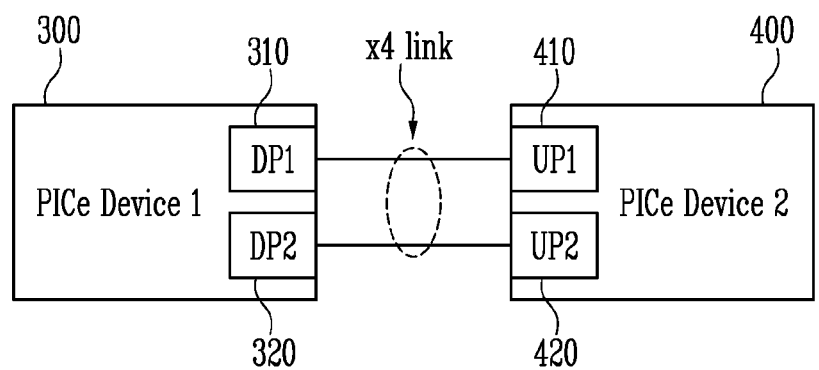
FIG. 10 is a block diagram illustrating PCIe devices connected through a dual port structure according to an embodiment of the present disclosure.

FIG. 10 is a block diagram illustrating PCIe devices connected through a dual port structure according to an embodiment of the present disclosure.

Referring to FIG. 10, a first PCIe device 300 including two downstream ports 310 and 320 and a second PCIe device 400 including two upstream ports 410 and 420 are illustrated. That is, the connection relationship between the PCIe devices illustrated in FIG. 10 may be substantially identical to the connection relationship between the PCIe devices illustrated in FIG. 8C.

In the connection relationship illustrated in FIG. 10, the first PCIe device 300 and the second PCIe device 400 are connected to each other through a dual port structure. Accordingly, the width of the link between the first PCIe device 300 and the second PCIe device 400 may be substantially the bandwidth of two ports.

For example, the first downstream port 310 of the first PCIe device 300 and the first upstream port 410 of the second PCIe device 400 may be configured as a x2 link. Further, the second downstream port 320 of the first PCIe device 300 and the second upstream port 420 of the second PCIe device 400 may be configured as a x2 link. In this case, the first PCIe device 300 and the second PCIe device 400 may be connected to each other substantially through a x4 link.

Figure 11:
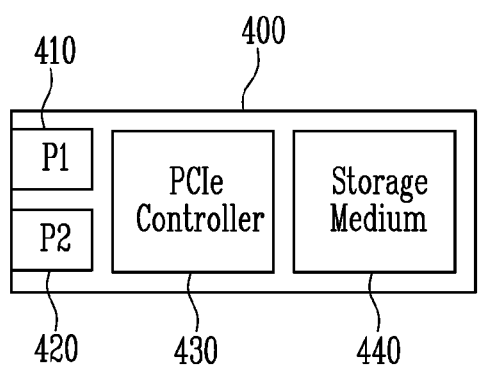
FIG. 11 is a block diagram illustrating examples of components of a PCIe device according to an embodiment of the present disclosure.

FIG. 11 is a block diagram illustrating examples of components of a PCIe device according to an embodiment of the present disclosure.

Referring to FIG. 11, the PCIe device 400 may include a first port 410, a second port 420, a PCIe controller 430, and a storage medium 440. The PCIe device 400 illustrated in FIG. 11 may be, for example, a storage device. For example, the PCIe device 400 may be a solid state drive (SSD). In this case, the storage device may include a plurality of nonvolatile memory devices. In an example, the storage device may include a plurality of NAND flash memory devices. When the SSD device supports a dual port structure, it may exchange data with a host device at a higher speed.

The PCIe controller 430 may control the overall operation of the PCIe device 400. When the PCIe device 400 is an SSD, the PCIe controller 430 may control an operation of storing data in the storage medium 440 and reading data from the storage medium 400. In an example, the PCIe controller 430 may function as a memory controller which controls the operation of the storage medium 440. In this case, the PCIe controller 430 may include a CPU for running internal firmware. Further, the PCIe controller 430 may include a buffer memory, an error correction circuit, etc.

Figure 12A:
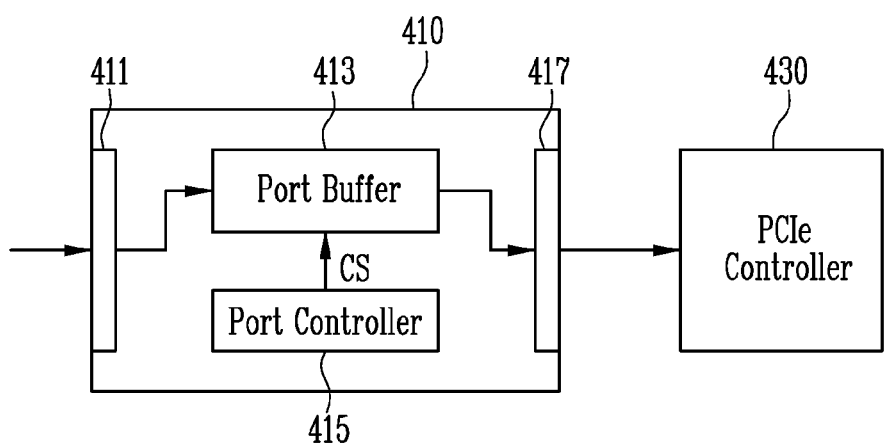
FIGS. 12A and 12B are block diagrams for describing the operation of ports during data reception and data transmission according to an embodiment of the present disclosure.
Figure 12B:
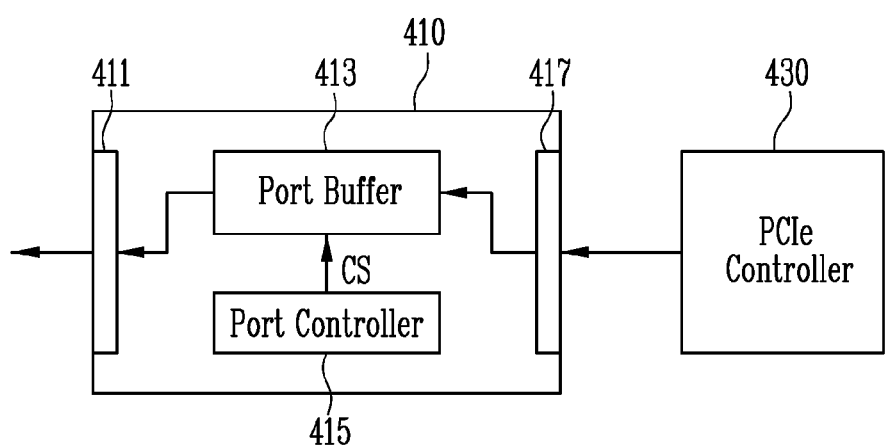

FIGS. 12A and 12B are block diagrams for describing the operation of ports during data reception and data transmission.

Referring to FIG. 12A, a detailed configuration of the first port 410 included in the PCIe device 400 of FIG. 11 is illustrated. The first port 410 may include an external input/output circuit 411, a port buffer 413, a port controller 415, and an internal input/output circuit 417. During data reception, data may be moved along a pointing direction of arrows indicated in FIG. 12A. For example, data received from an external device may be stored in the port buffer 413 through the external input/output circuit 411, and may then be transferred to the PCIe controller 430 through the internal input/output circuit 417. In an example, the received data may be write data, and the PCIe controller 430 may control the storage medium 440 to program the received write data.

The port buffer 413 may be implemented as a memory device which temporarily stores the data received through the external input/output circuit 411. In an example, the port buffer 413 may include a static RAM (SRAM). Moreover, the port controller 415 may control a data input/output operation of the port buffer 413 in response to a control signal CS.

During data output, data may be moved along a pointing direction of arrows illustrated in FIG. 12B. For example, when a data read request is received from the external device, the storage medium 440 may perform a data read operation under the control of the PCIe controller 430. The read data may be transferred to the first port 410 through the PCIe controller 430. In detail, data received from the PCIe controller 430 may be stored in the port buffer 413 through the internal input/output circuit 417, and may then be output to an external device through the external input/output circuit 411.

Figure 13A:
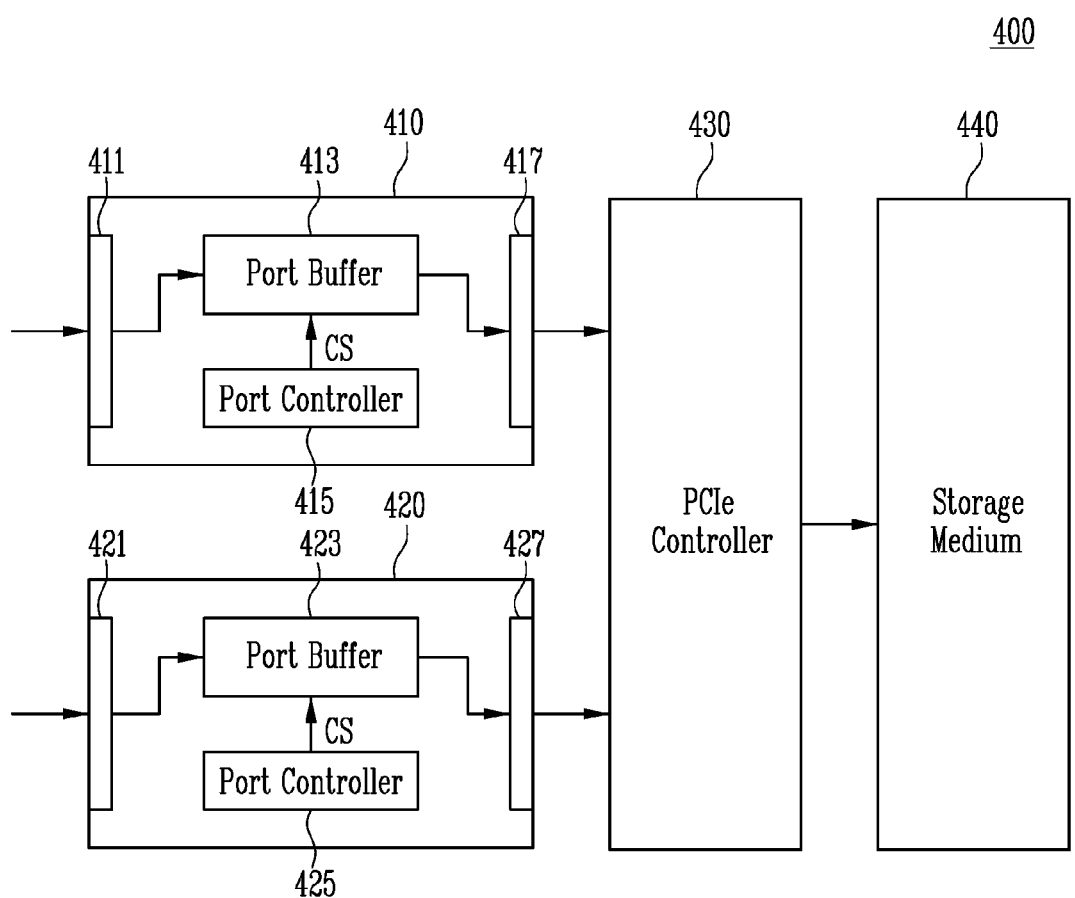
FIG. 13A is a block diagram for describing an example of data reception by a PCIe device in a dual port mode.
Figure 13B:
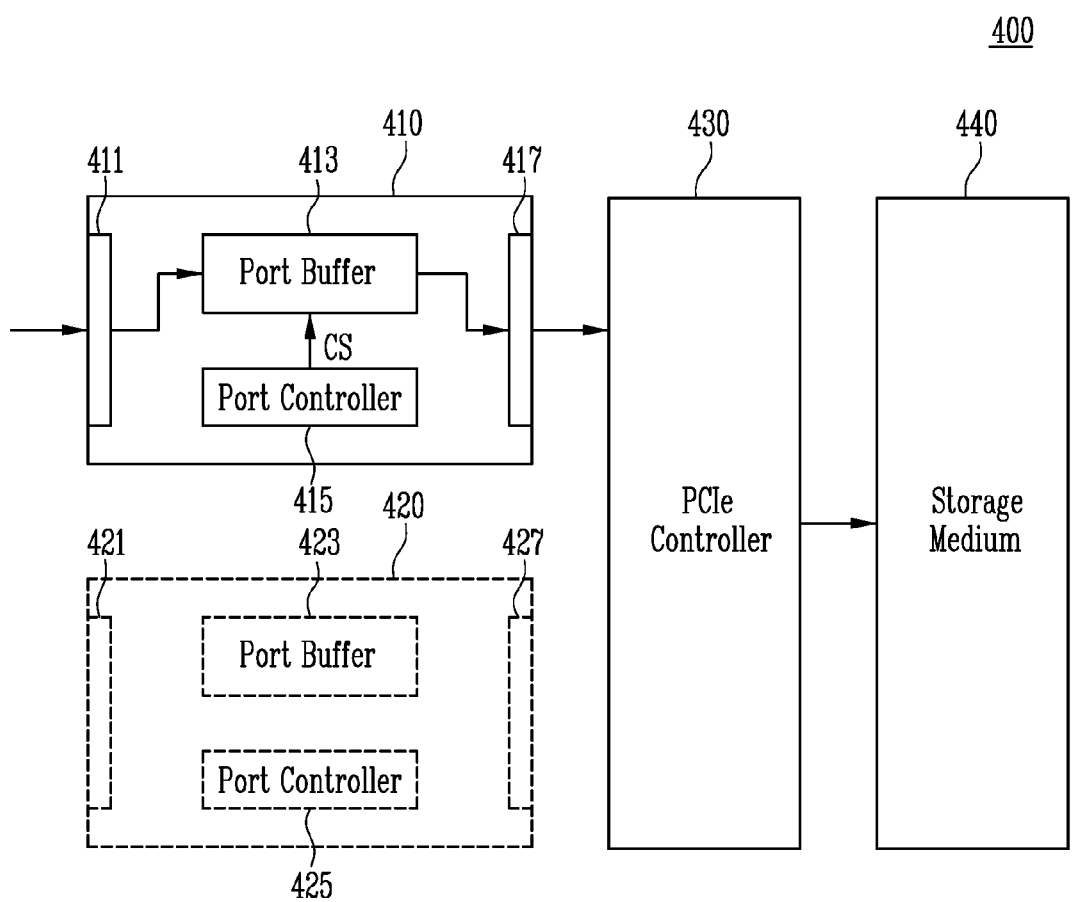
FIG. 13B is a block diagram for describing an example of data reception by the PCIe device in a single port mode.

FIG. 13A is a block diagram for describing an example of data reception by a PCIe device in a dual port mode according to an embodiment of the present disclosure, and FIG. 13B is a block diagram for describing an example of data reception by the PCIe device in a single port mode according to an embodiment of the present disclosure.

Referring to FIG. 13A, a PCIe device for receiving data using both a first port 410 and a second port 420 is illustrated. As described above, during data reception, data may be moved along a pointing direction of arrows indicated in FIG. 13A. For example, data received from an external device may be stored in port buffers 413 and 423 through external input/output circuits 411 and 421, and may then be transferred to a PCIe controller 430 through internal input/output circuits 417 and 427. Although not illustrated in FIG. 13A, it can be seen that data is moved in a direction opposite to that of the arrows indicated in FIG. 13A during data output.

As described above, the PCIe device 400 including two ports may transfer data faster in a dual port mode. However, if necessary, only one of the two ports may be used. For example, when an additional device connected to the PCIe device 400 supports only a single port structure, the PCIe device 400 may also use a single port structure. In an example, when an abnormality occurs in a connection to one of the two ports included in the PCIe device 400 during a link establishment process or while the link is used, only the other port may be used.

In this case, as illustrated in FIG. 13B, the PCIe device 400 may be operated in a single port mode using only the first port 410. That is, data transmission/reception may be performed only through the first port 410. In this case, the second port 420 is not used. Here, there is inefficiency in which the port buffer 423 included in the second port 420 is not used either.

In accordance with the PCIe device according to the embodiment of the present disclosure, when a PCIe device including a plurality of ports is operated in a single port mode, the PCIe device may be set such that the PCIe controller may access a port buffer included in a port that is not used. In this case, the PCIe controller may use an unused port buffer as an additional buffer memory. As a result, the size of the buffer memory used by the PCIe controller in a single port mode may be increased.

Figure 14A:
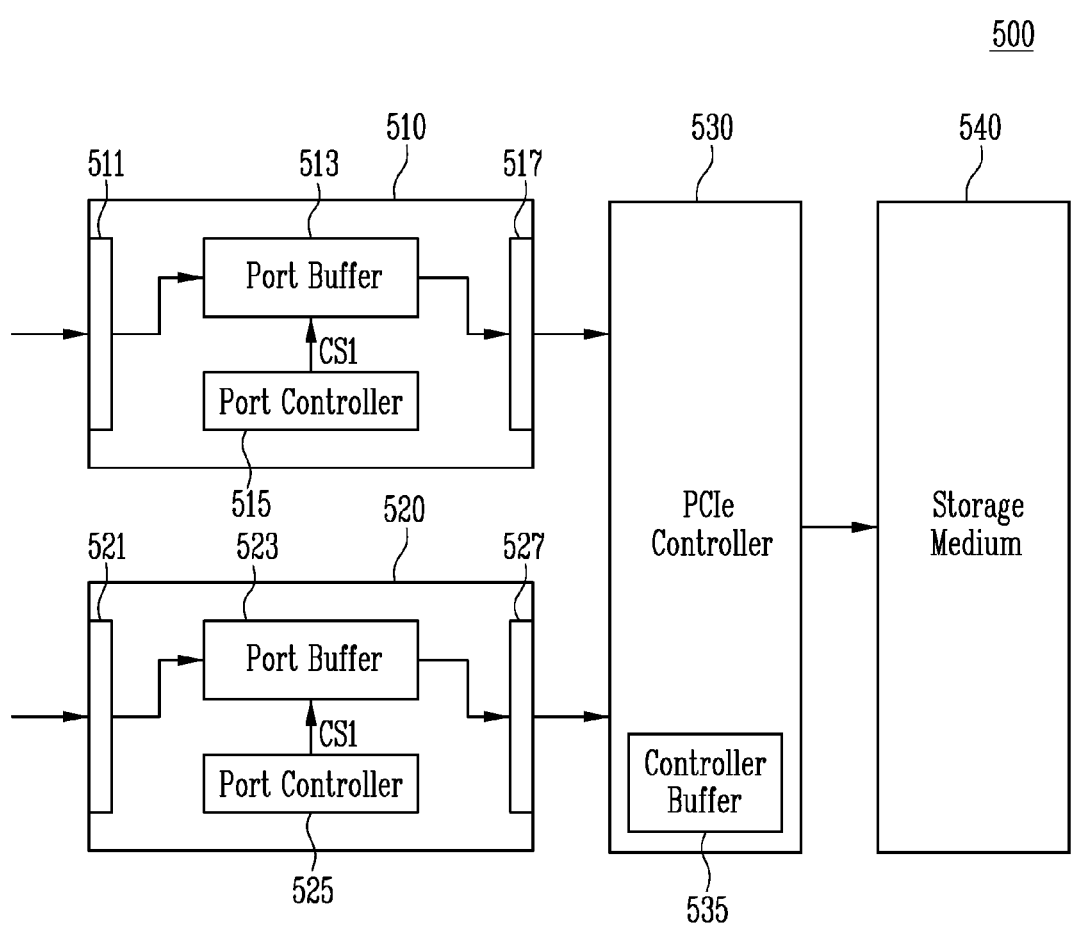
FIG. 14A is a block diagram for describing data reception by a PCIe device according to an embodiment of the present disclosure in a dual port mode.
Figure 14B:
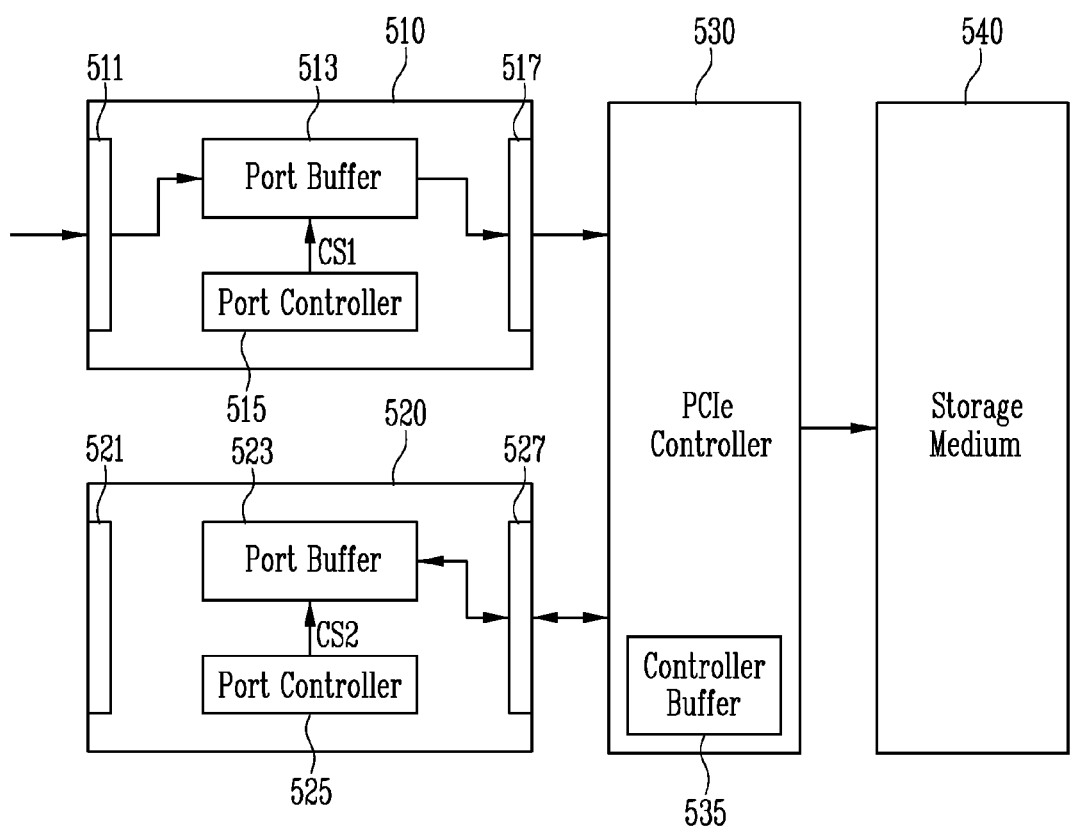
FIG. 14B is a block diagram for describing data reception by the PCIe device according to an embodiment of the present disclosure in a single port mode.

FIG. 14A is a block diagram for describing data reception by a PCIe device according to an embodiment of the present disclosure in a dual port mode, and FIG. 14B is a block diagram for describing data reception by the PCIe device according to an embodiment of the present disclosure in a single port mode.

Referring to FIG. 14A, a PCIe device 500 according to an embodiment of the present disclosure may include a first port 510, a second port 520, a PCIe controller 530, and a storage medium 540. Each of the first port 510 and the second port 520 may include an external input/output circuit 511 or 521, a port buffer 513 or 523, a port controller 515 or 525, and an internal input/output circuit 517 or 527. The PCIe controller 530 includes a controller buffer 535. The controller buffer 535 may be a buffer memory accessible by the PCIe controller 530. In an embodiment, the controller buffer 535 may include at least one of a static RAM (SRAM) or a dynamic RAM (DRAM).

In a dual port mode, both the first port 510 and the second port 520 are used. Therefore, the port buffers 513 and 523 included in the first port 510 and the second port 520, respectively, may be used for data movement in respective ports. Accordingly, in the dual port mode, the port controllers 515 and 525 included in the first port 510 and the second port 520 may control the respective port buffers 513 and 523 so that the port buffers are used for data transfer between the external input/output circuits 511 and 521 and the internal input/output circuits 517 and 527. In detail, the port controllers 515 and 525 may control the port buffers 513 and 523 in response to a first control signal CS1. By means of this, the port buffers 513 and 523 may be controlled to transfer data between the external input/output circuits 511 and 521 and the internal input/output circuits 517 and 527. In the dual port mode, the PCIe controller 530 cannot access the port buffers 513 and 523. That is, in the dual port mode, the PCIe controller 530 merely receives data, which is received from an external device, through the first and second ports 510 and 520 or transfers data, which is to be output to an external device, to the first and second ports 510 and 520, but cannot store arbitrary data in the port buffers 513 and 523 included in respective ports.

Referring to FIG. 14B, only a first port 510 may be used by way of example in a single port mode. In this case, the port buffer 513 included in the first port 510 may be used for data movement in the first port 510. Accordingly, the port controller 515 of the first port 510 may control the port buffer 513 in response to a first control signal CS1. The PCIe controller 530 cannot access the port buffer 513 of the first port 510 in use.

The port buffer 523 included in the second port 520 may be set to be accessible by the PCIe controller 530. In detail, the port controller 525 of the second port 520 may control the port buffer 523 in response to a second control signal CS2. In this case, the port buffer 523 may be set to transmit/receive data to/from the PCIe controller 530 through the internal input/output circuit 527. More specifically, the port buffer 523 may store data received from the PCIe controller 530 under the control of the PCIe controller 530. Furthermore, the port buffer 523 may transfer the stored data to the PCIe controller 530 under the control of the PCIe controller 530. In a single port mode, the PCIe controller 530 may utilize the port buffer 523 of the second port 520, which is not additionally used in addition to the existing controller buffer 535, as a buffer memory.

As illustrated in FIG. 14B, it is illustrated that, in a single port mode, the PCIe controller 530 exchanges data with the port buffer 523 through the internal input/output circuit 527. That is, in a single port mode and a dual port mode, data movement paths between the PCIe controller 530 and the port buffer 523 are illustrated as being identical to each other. However, this is only an example, and the present disclosure is not limited thereto.

For example, in the single port mode, the PCIe controller 530 may exchange data with the port buffer 523 through a separate path which bypasses the internal input/output circuit 527. For example, the PCIe controller 530 may exchange data with the port buffer 523 through a dedicated path for debugging the second port 520. The dedicated path for debugging may be different from a path coupled to the port buffer 523 to perform data input/output in a dual port mode.

Figure 15:
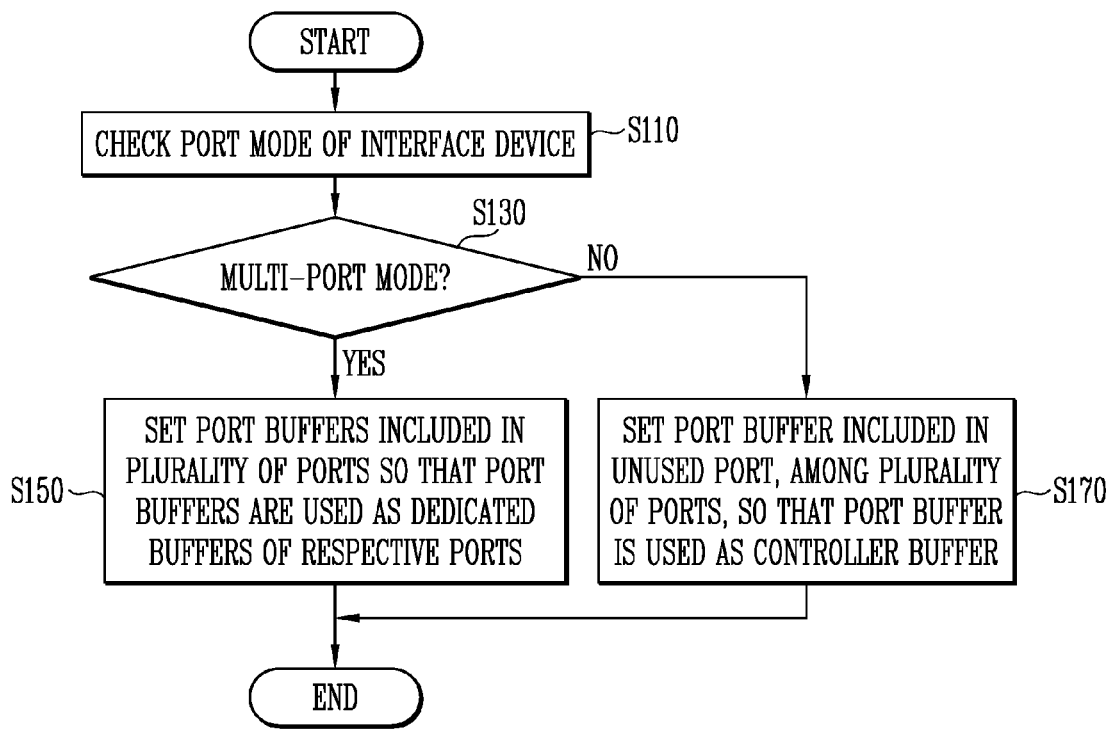
FIG. 15 is a flowchart illustrating a method of operating a PCIe device according to an embodiment of the present disclosure.

FIG. 15 is a flowchart illustrating a method of operating a PCIe device according to an embodiment of the present disclosure.

Referring to FIG. 15, the method of operating a PCIe device according to an embodiment of the present disclosure may include checking the port mode of an interface device at operation S110, when the port mode is a multi-port mode (in the case of "Yes" at operation S130), setting port buffers included in a plurality of ports so that the port buffers are used as dedicated buffers for respective ports at step S150, or when the port mode is a single port mode (in the case of "No" at operation S130), setting the port buffers so that a port buffer included in an unused port, among the plurality of ports, is used as a controller buffer at operation S170.

At operation S110, whether the PCIe device 500 of FIGS. 14A and 14B is currently used in a dual port mode or in a single port mode may be determined. The port mode of the PCIe device may be set by an external host device. In detail, when the PCIe device and the host device are connected to each other, the port mode of the PCIe device may be set. Here, the PCIe device may determine whether the port mode is set to a dual port mode or a single port mode.

When the port mode of the PCIe device is a multi-port mode, for example, a dual port mode (in the case of "Yes" at operation S130), port buffers may be set such that the port buffers included in the plurality of ports are used for data movement in the corresponding ports at operation S150. In this case, the PCIe controller cannot access individual port buffers.

When the port mode of the PCIe device is a single port mode (in the case of "No" at operation S130), the port buffers are set such that the PCIe controller may access a port buffer included in an unused port, among the plurality of ports. By means of this, the port buffer included in the unused port may be used as a controller buffer of the PCIe controller at operation S170. Even in this case, the port buffers included in ports in use may be set to be used for data movement in the corresponding ports, and the PCIe controller cannot access the port buffers.

Figure 16:
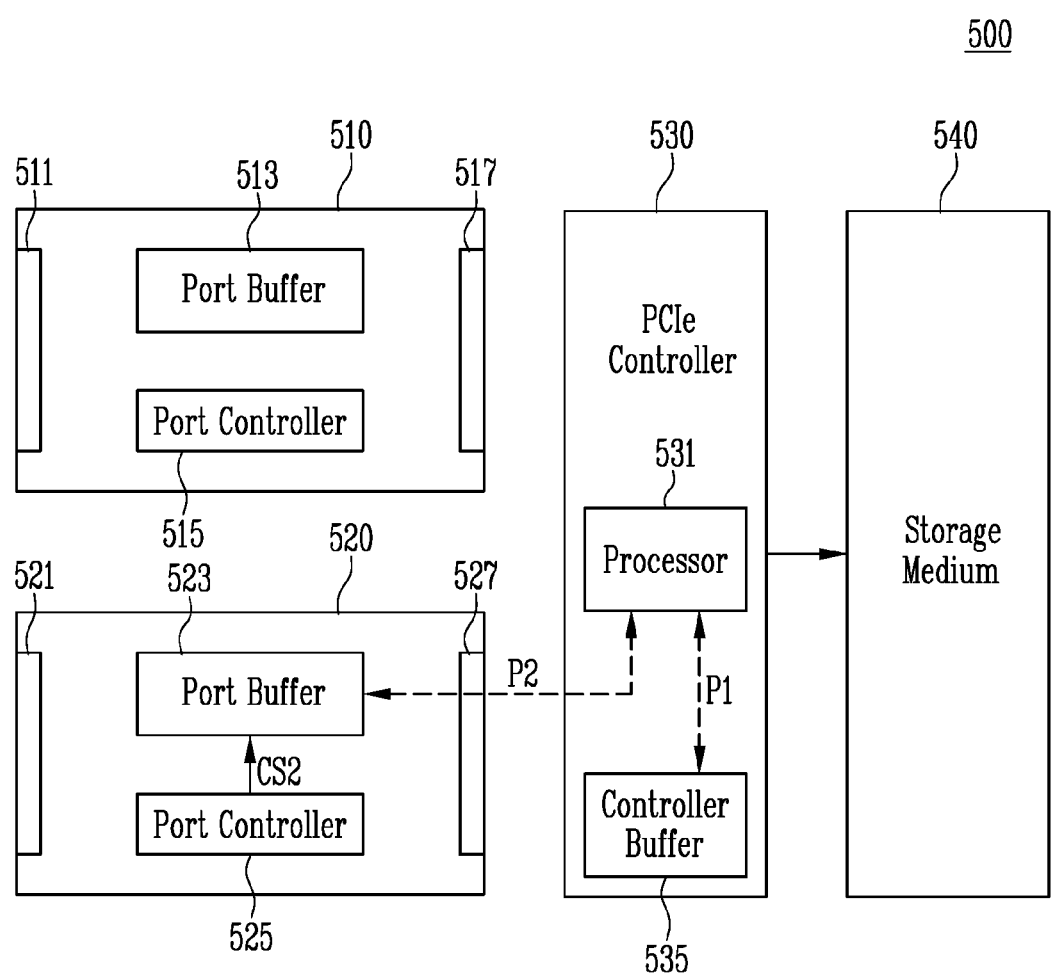
FIG. 16 is a diagram for explaining a buffer access path in a PCIe device according to an embodiment of the present disclosure.

FIG. 16 is a diagram for describing a buffer access path in a PCIe device according to an embodiment of the present disclosure.

Referring to FIG. 16, a PCIe controller 530 of a PCIe device 500 may further include a processor 531 in addition to a controller buffer 535. The processor 531 of the PCIe controller 530 may access the controller buffer 535 and a port buffer 523. In an embodiment, the processor 531 may access the controller buffer 535 through a first path P1. Also, the processor 531 may access the port buffer 523 through a second path P2. In an embodiment, the second path P2 may be a path for debugging the second port.

The first path P1 may be a path through which the processor 531 internally accesses the controller buffer 535 in the PCIe controller 530. In an embodiment, the controller buffer 535 may be implemented as a static RAM (SRAM). When the controller buffer 535 is implemented as an SRAM, the controller buffer 535 may be implemented as a buffer pool divided into regions having a certain size. In this case, respective regions of the controller buffer 535 may be accessed with a first base address and an address defined by an offset value.

When the port buffer 523 is used as the buffer of the PCIe controller, an additional address different from the first base address of the controller buffer 535 may be used. The port buffer 523 may also be implemented as a buffer pool divided into regions having a certain size, and may be accessed by a second base address and an address defined by an offset value.

A data unit of the controller buffer 535 designated by the first base address and the offset value may be different from a data unit of the port buffer 523 designated by the second base address and the offset value. Hereinafter, a description will be made with reference to FIGS. 17A and 17B.

Figure 17A:
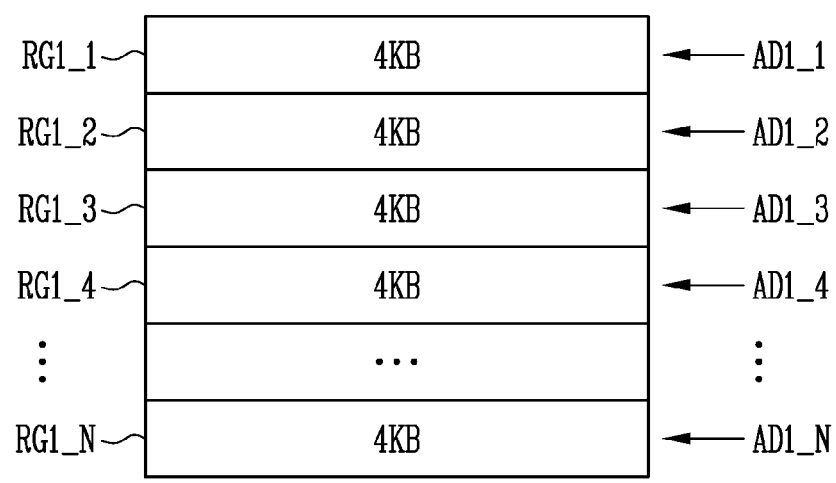
FIGS. 17A and 17B are diagrams for describing an address structure for accessing a controller buffer and a port buffer according to an embodiment of the present disclosure.
Figure 17B:
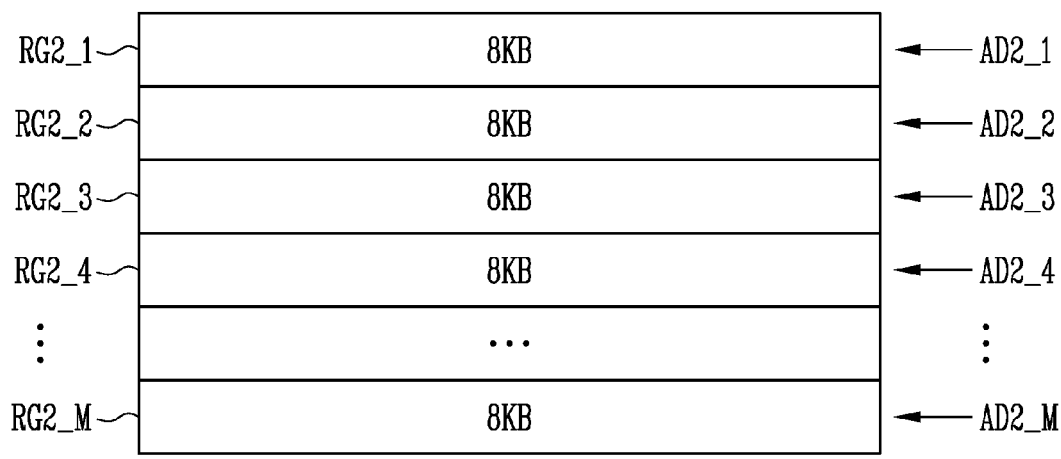

FIGS. 17A and 17B are diagrams for describing address structures for accessing a controller buffer and a port buffer according to an embodiment of the present disclosure.

Referring to FIGS. 16 and 17A, the controller buffer 535 may be divided into N regions RG1_1, RG1_2, ..., RG1_N. In an embodiment, the regions of the controller buffer 535 may store data having a size of 4 KB. However, this is only an example, and each of the regions of the controller buffer 535 may store data having any size other than 4 KB. The respective regions RG1_1, RG1_2, ..., RG1_N may be accessed by addresses AD1_1, AD1_2, ..., AD1_N corresponding thereto.

In an embodiment, the address AD1_1 may be a first base address. The first base address may be an address used to access the controller buffer 535 through the first path P1. The address AD1_2 may be an address obtained by adding an offset corresponding to 4 KB to the first base address. The address AD1_3 may be an address obtained by adding an offset corresponding to 8 KB to the first base address. The address AD1_4 may be an address obtained by adding an offset corresponding to 12 KB to the first base address. In this way, the address AD1_N may be an address obtained by adding an offset corresponding to (N−1)*4 KB to the first base address.

Referring to FIGS. 16 and 17B, the port buffer 523 may be divided into M regions RG2_1, RG2_2, ..., RG2_M. In an embodiment, the regions of the port buffer 523 may store data having a size of 8 KB. However, this is only an example, and each of the regions of the port buffer 523 may store data having any size other than 8 KB. Respective regions RG2_1, RG2_2, ..., RG2_M may be accessed by addresses AD2_1, AD2_2, ..., AD2_M corresponding thereto.

In an embodiment, the address AD2_1 may be a second base address. The second base address may be an address used to access the port buffer 523 through the second path P2. In an embodiment, the second path P2 may be a dedicated path for debugging the second port 520. The address AD2_2 may be an address obtained by adding an offset corresponding to 8 KB to the second base address. The address AD2_3 may be an address obtained by adding an offset corresponding to 16 KB to the second base address. The address AD2_4 may be an address obtained by adding an offset corresponding to 24 KB to the second base address. In this way, the address AD2_M may be an address obtained by adding an offset corresponding to (M−1)*8 KB to the second base address.

As described above, the address structure for accessing the controller buffer 535 through the first path P1 may be different from the address structure for accessing the port buffer 523 through the second path P2. In an embodiment, the second path P2 may be a path for debugging the second port 520.

In accordance with embodiments of the present disclosure, there may be provided an interface device that is capable of efficiently using buffers included in a plurality of ports and a method of operating the interface device.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. An interface device comprising:
a first port including a first port buffer;
a second port including a second port buffer; and
a controller configured to exchange data with the first port and the second port,
wherein, in a single port mode, the first port buffer is used for data transfer between an external device and the controller, and
wherein, in the single port mode, the second port buffer is not used for data transfer between the external device and the controller and is set as a buffer memory of the controller.

2. The interface device according to claim 1, wherein, in a dual port mode, each of the first and second port buffers is configured for data transfer between an external device and the controller.

3. The interface device according to claim 2, wherein:
the first port further includes a first external input/output circuit, a first internal input/output circuit, and a first port controller,
the second port further includes a second external input/output circuit, a second internal input/output circuit, and a second port controller, and
the first and second port controllers are configured to control, in the dual port mode, the first and second port buffers to transfer data between the first and second external input/output circuits and the first and second internal input/output circuits, respectively, in response to a first control signal.

4. The interface device according to claim 3,
wherein the first and second external input/output circuits are coupled to the external device, and
wherein the first and second internal input/output circuits are coupled to the controller.

5. The interface device according to claim 1,
wherein the first port further includes a first external input/output circuit, a first internal input/output circuit, and a first port controller,
wherein the second port further includes a second external input/output circuit, a second internal input/output circuit, and a second port controller,
wherein the first port controller is configured to control, in the single port mode, the first port buffer to transfer data between the first external input/output circuit and the second internal input/output circuit in response to a first control signal, and
wherein the second port controller is configured to control, in the single port mode, the second port buffer to store therein data received from the controller in response to a second control signal.

6. The interface device according to claim 5, wherein the second port buffer is configured to exchange, in the single port mode, data with the controller through the second internal input/output circuit.

7. The interface device according to claim 5, wherein the second port buffer is configured to exchange, in the single port mode, data with the controller through a path bypassing the second internal input/output circuit.

8. The interface device according to claim 7, wherein the path is used for debugging the second port.

9. A method of operating an interface device, the method comprising:
checking a port mode of an interface device including a plurality of ports and a controller; and
setting a port buffer included in an unused port of the plurality of ports as a buffer of the controller when the port mode is checked as a single port mode,
wherein the unused port is not used for data transfer between an external device and the controller.

10. The method according to claim 9, wherein the setting of the port buffer included in the unused port includes controlling the port buffer to store therein data received from the controller.

11. The method according to claim 10, wherein the controlling includes storing data in the port buffer through a path for debugging the unused port.

12. The method according to claim 9, further comprising setting a port buffer included in a port in use among the plurality of ports as a dedicated buffer of the port in use.

13. The method according to claim 12, wherein the port buffer included in the port in use is set for data transfer between the external device and the controller.

14. The method according to claim 9, further comprising setting, when the port mode is checked as a multi-port mode, port buffers included in the plurality of ports as dedicated buffers of the plurality of ports, respectively.

15. The method according to claim 14, wherein the port buffers included in the plurality of ports are set for data transfer between an external device and the controller.

16. An interface device comprising:
first and second ports each configured to be activated to transfer data, the second port having a port buffer; and
a controller configured to:
activate the first port to transfer the data between an external device and the controller,
deactivate the second port to not transfer the data between the external device and the controller, and
access the port buffer of the second port as a buffer of the controller.

* * * * *